United States Patent [19]

Enright

[11] Patent Number: 4,898,235

[45] Date of Patent: Feb. 6, 1990

[54] WELLHEAD APPARATUS FOR USE WITH A PLUNGER PRODUCED GAS WELL HAVING A SHUT-IN TIMER, AND METHOD OF USE THEREOF

[75] Inventor: David J. Enright, Breaux Bridge, La.

[73] Assignee: Vernon E. Faulconer, Inc., Breaux Bridge, La.

[21] Appl. No.: 267,992

[22] Filed: Nov. 7, 1988

[51] Int. Cl.⁴ ............................................. E21B 43/00
[52] U.S. Cl. ................................... 166/64; 166/95; 166/105; 417/57
[58] Field of Search ............... 166/252, 372, 311, 68, 166/70, 64, 95, 97, 105, 153, 75.1; 417/57, 58

[56] References Cited

U.S. PATENT DOCUMENTS

| | | | |
|---|---|---|---|
| 3,031,971 | 5/1962 | Roach | 417/57 |
| 3,095,819 | 7/1963 | Brown et al. | 417/57 |
| 3,351,021 | 11/1967 | Moore, Jr. | 417/57 |
| 3,424,066 | 1/1969 | Moore, Jr. | 166/70 |
| 3,545,540 | 12/1970 | Waldron | 166/70 |
| 4,211,279 | 7/1980 | Isaacks | 166/70 |
| 4,417,858 | 11/1983 | Stout | 417/58 |
| 4,476,923 | 10/1984 | Walling | 166/105 |
| 4,575,044 | 3/1986 | Gentry | 166/70 |

FOREIGN PATENT DOCUMENTS 2815705 10/1979 Fed. Rep. of Germany ........ 166/75

Primary Examiner—Stephen J. Novosad
Assistant Examiner—Terry Lee Melius
Attorney, Agent, or Firm—Gunn, Lee & Miller

[57] ABSTRACT

Wellhead apparatus as set forth for installation on a producing gas well which has a certain measure of condensate therein. The device includes an alignment tube which is precisely constructed for easy transition from the tubing string. That connects to a master valve which connects to a tee thereabove. A lateral flow line connected with a gas valve regulates gas produced from the well. The master valve is just below the tee, and the tee extends upwardly into a lubricator extension tube. The two are connected together by a lubricator extension union sub which utilizes a lock nut engaging a pair of matching shoulders. A method of timed production is also disclosed.

9 Claims, 1 Drawing Sheet

WELLHEAD APPARATUS FOR USE WITH A PLUNGER PRODUCED GAS WELL HAVING A SHUT-IN TIMER, AND METHOD OF USE THEREOF

BACKGROUND OF THE DISCLOSURE

The disclosure is directed to an apparatus and method of use of the apparatus for producing from a natural gas well. More particularly, this relates to a partially depleted reservoir production procedure. As the internal pressure drive of a partially depleted formation is reduced over a period of time, it is generally expedient to shift to intermittent production of liquid slugs to efficiently produce the formation. This typically involves the installation of intermittent gas lift system, and one version of such equipment is the installation of a plunger which separates an accumulated liquid slug to be driven up the well by the gas propellant. By this approach, formation gas is obtained and various liquid from the formation are likewise produced. Such liquids typically include condensates which might otherwise collect as droplets on the tubing wall.

An exemplary system is identified in U.S. Pat. No. 4,211,279. This shows a wellhead apparatus connected with a tubing string installed in a casing. It further includes a plunger catcher which holds the free-fall plunger at its uppermost position to permit gas to escape from the tubing string. Moreoever, it cooperates with a timer to adjust the cycle duration to thereby obtain the desired production rate.

Similar disclosures are found at U.S. Pat. Nos. 4,575,044, 3,545,540, 3,424,066 and 2,918,015. In very general terms, the various references set forth systems of apparatus including wellhead devices, plungers of all types and descriptions, and valves which connect with downstream gas consuming facilities. For instance, the downstream line may connect through a valve to a gas gathering system.

Service of the wellhead apparatus is an important factor. The context includes certain service requirements. In general, this type equipment is installed on wells which are in the twilight zone of their productive lives. At this stage, the well may have been serviced for a number of years. Typically, it has a formation gas drive which is adequate for some purposes, but which is typically inadequate to lift liquid condensates. This causes liquids to accumulate at or near the bottom. When liquids accumulate, they create problems in continued production. One of the problems relates to the collection of condensate along the tubing wall. While the condensate typically always includes some petroleum products, they may also include salt water, thereby running the risk of forming rust in the tubing string or the wellhead apparatus. Thereafter, the installation of a reciprocating free-fall plunger in the system tends to scrape the rust fro the pipe wall, thereby increasing the risk of damage to the tubing string and the wellhead apparatus. Moreover, the reciprocating plunger has substantial impact at the termination of the free-fall cycle. This tends to wear the plunger and may damage the plunger, thereby forming an impact so great that wear and tear requires periodic maintenance. It is difficult to maintain old equipment. Especially this is so if the well is 20 or 30 years old. Often, it will be necessary to pull the tubing string, install new packers, repair holes in the casing and the like. Even when a less intrusive repair sequence is required, as for instance by merely removing the wellhead equipment, the repairs are tedious and difficult on the old equipment. The present invention is a wellhead apparatus which makes it much easier to repair the equipment. The present invention is an overhead wellhead apparatus which has an upwardly extending lubricator extension pipe located above a tee where the tee directs produced gas laterally. The overhead equipment is particularly advantageous in that the very top end of the lubricator extension terminates at a closed housing which supports an internally located piston. The plunger is permitted to travel upwardly through the lubricator extension. A plunger intercept mechanism is located therein, and is compressed momentarily by the traveling plunger. The intercept mechanism is compressively loaded. This cushions the shock of stopping the plunger. Moreover, all of this equipment is located above a connective flange which enables the lubricator extension to be selectively removed. The well is sealed off by means of a union above the master valve for easy disconnection.

One important feature of the present apparatus is the use of a flanged shoulder at the lubricator extension which is located above the tee. This coacting arrangement routinely enables the lubricator extension to be disconnected. Keep in mind that the lubricator extension may extend several feet above the ground at the wellhead. Service on this equipment is required long after the original drilling rig and workover rigs have been moved away from the location. This equipment stands substantially up in the air and is difficult to service. The present apparatus incorporates an upstanding, adjacently located vertical ladder having a frame member for supporting a laterally extending arm at the top, the arm being positioned over the lubricator extension. It has a protruding arm which terminates at a swivel, thereby permitting the lubricator extension to be disconnected and swung to the side. The lubricator extension is joined serially in line by means of a union nut clamping opposing flanges for connection of the lubricator extension and a lubricator extension union sub therebelow. The union sub is serially connected above the tee.

This apparatus thus permits easy service. Service is implemented at a time when the plunger is caught in the lubricator extension or is located downhole. In either case, the lubricator extension breaks free and swings to the side. This particularly is important to enabling others to have access to thereby furnish maintenance and service on the equipment. Through a use of a quickly disconnected union, service personnel can remove the union nut, make a disconnection at the bottom of the lubricator extension at a mating flange on the lubricator extension union sub, swing the components apart, and completely service the equipment in this fashion. Moreover, this can be done with the plunger at any location including in the lubricator extension.

The present disclosure is likewise directed to a method of operating the plunger in relation to the amount of fluid produced, shut-in interval and plunger travel time. Generally, it is desirable to operate the system so that the plunger brings to the surface an optimum measure of produced liquid. If excessive accumulation downhole occurs, it is difficult to produce gas through the standing column of liquid. On the other hand, if excessive numbers of trips of the plunger occur, then the gas fluid drive is usually insufficient and the equipment tends to wear out more rapidly. The formation is probably depleted more rapidly, perhaps to the detriment of the formation. It should be recalled that excessive production rates are damaging to the formation and may lead to small capillary blinding or failure of the flow channels in the same formation extending to the well borehole. In any event, it is desirable to produce the well at a controlled rate and the present method contemplates such a controlled rate of production which correlates these variables. More will be noted on this method of operation hereinafter.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is a side view of the wellhead apparatus of the present invention installed on a well and illustrates a master valve tee and lubricator extension suspended above a tubing string and which is intercepted by the wellhead apparatus of FIG. 1 for operation sequentially to remove liquid condensate from the well borehole.

FIG. 2 is a sectional view of the plunger of the present invention.

GENERAL DESCRIPTION OF THE PREFERRED EMBODIMENT

The method of the present invention therefore operates declining gas wells with a shut-in cycle, taking into account bottom hole pressure, the ratio of liquids to gas produced by the well, the time required for the plunger to travel to the surface which is substantially related to the depth of the well, the rate of pressure drop resulting from extended open flow, the quality of the seal between the plunger and the tubing string. These are significant factors although other factors may impact operation of the well also. In any event, the method of the present invention provides a control system so that timing can then be achieved whereby the well is periodically shut-in, periodically flowed, and the plunger is selectively operated in a free traveling mode when flow is permitted. The plunger, during shut-in rests at the bottom so that condensate will collect above the plunger.

The present apparatus summarized as wellhead equipment attaching at the top end of a tubing string in a cased gas well. It incorporates a tubing spool which supports a hanger flange thereabove. Suitable flanges and nipples connect above that with the master valve which is normally left open. The valve connects with a tee having a lateral flow line which delivers the produced natural gas and condensate therewith. The flow line is closed selectively by a valve having an operator which in turn is operated by a timer. The tee extends upwardly to a lubricator extension union sub. It terminates in a flange connecting with a mating flange at the lower end of a lubricator extension. They are joined by a union nut. The lubricator extension extends upwardly to a coupling which encloses a plunger interceptor piston. It is supported on a spring that extends upwardly to a plunger interceptor cap. The lubricator extension is equipped with external hand holds at two locations for ease of handling. The hand holds are accessible to personnel climbing a ladder immediately adjacent to the well. The free moving plunger is able to travel through the wellhead apparatus above the flow line from the tee, enabling all the liquid lifted by the plunger to be delivered into the flow line for production so that it is no longer free to trickle back down through the tubing string. Moreover, service which is often required to accomplished easily by personnel climbing the adjacent ladder holding up the wellhead apparatus, disengaging the union nut which breaks the connection between the union at the upper end of the tee connecting with the lubricator extension, and then permitting the upper end of the apparatus to be swung to the side.

DETAILED DESCRIPTION OF THE PREFERRED EMBODIMENT

Figure 1:
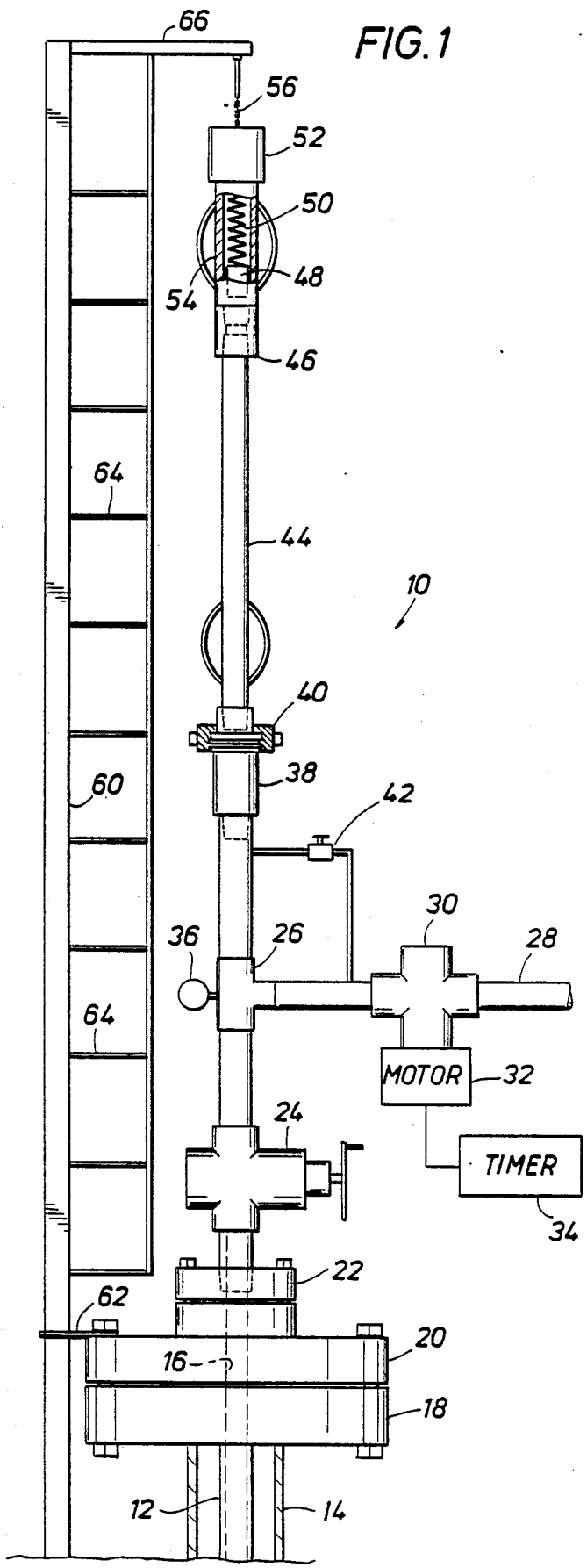

Attention is first directed to FIG. 1 of the drawings where description of the system will be given to the system installed at the wellhead of a producing gas well. The description will proceed from bottom to the top with a view of describing the apparatus installed on a producing well. A producing well, like most producing wells, incorporates a tubing string within a casing. The system is indicated generally by the number 10 and is thus affixed permanently to the wellhead. The well thus incorporates a tubing string 12 which is located within a casing 14. Presumably, a packer is located in the casing to assure that pressure integrity is maintained between the tubing string and surrounding casing. Thus, natural gas is produced only in tubing, not through the casing. The tubing 12 is standard diameter, one example being 2⅜ inch tubing. It terminates at an upper end and connects to a tubing extension 16 which is a machined true circular member. After the tubing 12 has been installed in the well and after it has been used for a period of time, it is rarely true, typically having a number of dents, bends and oval sections where it has been slightly crushed. The plunger, as will be described, must travel through the tubing. When the plunger is headed upwardly driven by produced natural gas, it typically can travel quite fast. If the pressure drive is sufficient, the plunger can be traveling quite fast and yet will wobble as a result of the lack of true circular tubing. The wobble which is probable when the plunger passes into the tubing 12 is eliminated by the tubing extension 16. The leading edge of the plunger is chamfered so that it can enter the true tubing 16 and is then straightened. Wobble is thus eliminated, the tube 16 serving as a transition piece whereby wobble is eliminated and the plunger is directed upwardly to the other components.

The tubing 16 passes through a tubing spool 18, and also through a hanger flange plate 20. That in turn connects with a suitable companion flange 22 which is affixed to the upper end of the tubing 16 and which enables connection into a master valve 24. The valve 24 is normally full open, but it can be closed to permit remedial work on the apparatus. Normally, the internal cavity in the gate valve in the vicinity of the gate is wider than the tubing and parts of the gate. This creates a region where wobble might occur. This region is reduced in length by extending the tubing above and below the valve 24 toward the valve gage to reduce the gap across the valve element. The upper and lower tubings connected ot the valve 24 have extensions internally extending toward the gate to assure supportive guidance of the plunger. The master valve 24 connects with a tee 26 installed so that a flow line 28 is connected to a motor controlled valve 30 which opens or closes the flow line and which is therefore used to shut-in the well. The valve 30 is connected to a motor operator 32 for the valve to open or close the valve. The motor 32 is operated in a timed fashion by a timer 34 which is switched off and on as required. The timer 34 controls production of the well. It will be adjusted in the fashion described hereinafter. For convenience, a pressure gauge 36 is connected to the tee to provide a visual reading of wellhead pressure.

The tee connects serially to a lubricator extension union sub 38. The sub 38 is attached at the top end of the tee to deliver the plunger upwardly when it travels through the tee. The sub 38 is provided with a flange at the upper end, and a suitable union nut 40 is placed on the union sub to attach the union sub 38 to additional apparatus to be described. The nut 40 thus engages a pair of matching flanges which are abutted together and which thread in the intended fashion. The tee 26 is drilled with a small hole or passage to enable a small line 42 to be connected. The line 42 removes a small portion of the produced flow also. The line 42 can be omitted in circumstances described below. It is, however, sometimes incorporated to serve as a pressure build-up relief mechanism. This will be described in detail.

The union nut 40 assists in connecting a lubricator extension 44 above, axially in line, and having substantial length to enable the plunger to travel into the extension 44. The lubricator extension terminates at a coupling 46 which encloses a slidably received plunger interceptor piston 48. This piston is supported by a plunger interceptor spring 50. The spring in turn is suspended at the lower end of a cap 52 that threads around a tubular member 54 which serves as a recoil cylinder for the plunger interceptor piston 48. The cap has a suitable eyelet formed at the top which connects with a short chain of several links indicated at 56. The chain 56 is connected to a support structure to be described.

An upstanding pipe 60 is parallel to the lubricator extension 44. It is anchored by suitable frame members 62. The pipe 60 stands adjacent to and taller than the wellhead apparatus, and supports a number of rungs to comprise a ladder. The rungs 64 are welded to the pipe and extend in parallel fashion so that service personnel can climb to the top. At the top, there is a laterally extending arm 66 which holds the chain 56. It is sufficiently strong so that it will support the weight of the lubricator extension and connected equipment. Moreover, it is installed immediately over the wellhead so that the chain permits the lubricator extension 44 to dangle over the well, and thereby has a support in the event the lubricator extension is disconnected. Disconnecting occurs at the union nut 40 which is periodically released so that the lubricator extension can be pushed to the side. A suitable swivel is used to connect the chain 56 between the cap 52 and the protruding arm 66.

The equipment is installed by assembly of the wellhead apparatus over the tubing 12. The equipment, once installed, is then set up to operate in accordance with the method described below. A review of the background of the use of this equipment is helpful to understand its mode of operation.

When the well typically is first drilled, it will produce natural gas with substantial pressure drive. The formation is produced continuously. In the event that condensate is formed, the pressure drive from the formation is sufficient that any condensate collecting on the wall of the tubing string 12 will be forced up to the surface. As formation pressure declines, the production rate reduces, and the velocity of the produced natural gas will drop. As it drops, more condensate will be formed on the tubing wall and will drip back down into the bottom of the tubing string because the velocity is insufficient to carry the condensate out through the well. Ultimately, a slug of liquid will accumulate in the well. This forces the produced gas to bubble up through the slug. This further retards production. It is important to periodically clear the tubing string of the collection of condensate. It is also important to clear the condensate because it may include a mixture of oil and water. In any event, this collection of liquid at the bottom of the tubing string represents a liquid trap which impedes natural gas production. This liquid is lifted to the surface above the plunger and becomes what is known as a slug. Some of the slug will drip back through the plunger as the plunger travels upwardly. In any case, the slug that is actually delivered represents the measured quantity of liquid which is removed from the well for that particular trip of the plunger. The slug is sometimes measured in the number of seconds that liquid flows from the flow line 28. Normally, the flow line is connected from the tee into a gathering line which typically communicates with other equipment which will typically include a liquid trap. The liquid is normally valuable and is collected because it normally includes heavier molecules. That is, $CH_4$ is the light molecule which normally makes up natural gas, although there may be heavier gaseous molecules in the flow. When the molecule reaches the range of about six or more carbon atoms in the molecule, it becomes heavy, and therefore will condense. As the pressure is reduced in the tubing string, condensation occurs where the droplets collect on the wall of the tubing and drip along the wall. The plunger forces this accumulated liquid slug up through the tubing string out through the collection flow line 28. The collected liquid is next separated to remove water and the condensate is then sold as a separate produced quantity.

DESCRIPTION OF THE PLUNGER

Figure 2:
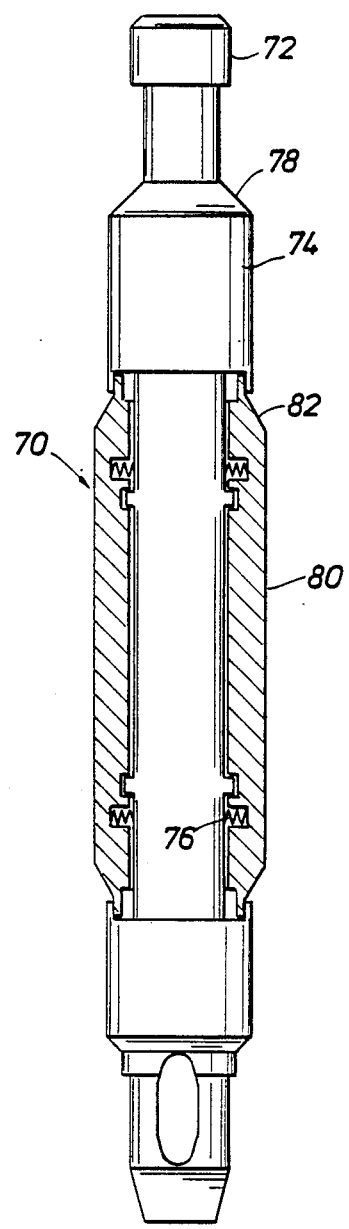

In FIG. 2 of the drawings, the numeral 70 identifies a plunger. The plunger is constructed with a fishing neck 72 at one end to enable removal in the event it becomes caught or stalled in the tubing string. It has an elongate body 74, and an axial passage is formed through the body from the top end to the bottom end. This passage is normally plugged by a threaded plug which is placed on the end of the passage. The body has a tapered surrounding shoulder 78. It is constructed with a surrounding recessed area, and three tapered plates 80 are installed on the exterior. The tapered plates are symmetrical in that they are equipped with tapered shoulders at each end 82. The shoulders 82 have an angle of about 8° in the preferred embodiment. It is the tapered arrangement beginning with the first taper at 78, and the second taper 82 at a lesser angle which enables the rapidly moving plunger to enter the smooth transition tube 16 shown in FIG. 1. The insert plates 80 are forced radially outwardly by means of suitable coil springs 76 which are captured between the central mandrel and the surrounding plates. The plate 80 is a circular plate, mounted for movement so that the plunger 70 can expand or contract in thickness permitting the plunger to accommodate irregular sizes of tubing. This arises because the tubing is not perfectly round, is perhaps damaged and otherwise bent or deformed.

While the roundness and condition of the tubing string is a first factor in operation of the well subject to intermittent flow with shut-in intervals, another factor is the depth of the well. These two factors define the time required for the plunger to travel from the bottom to the top. In other words, if all other conditions are fixed, the duration required for the plunger trip is substantially dependent upon length of the well, and is further dependent on the condition of the tubing string, namely whether it is round, etc.

Another factor in the trip time is the ratio of liquid to gas produced by the formation. Assume for the moment that the formation produces only natural gas having no condensate therein. In that instance, it is simply a flowing gas well which forms no liquid that makes up the slug lifted by the plunger. In that instance, the plunger will not be needed. The liquid petroleum condensates, may, however, also include some fresh water or saltwater. In any event, the rate at which the condensate liquids are accumulated in the bottom of the tubing string is determined in part but the ratio of liquid/gas produced by the formation. Generally, this will settle to a more or less constant level of liquid produced on a daily basis. The liquid that is produced normally accumulates at the bottom of the tubing string. Even though droplets are formed along the tubing string toward the surface, they drip back to the bottom end of the tubing string and collect there. The droplets so accumulated form the liquid slug. Even after the slug has been accumulated, the natural gas will bubble up through the slug. However, this slows down gas production because the liquid slug serves as a production choke.

The liquid produced from the well can best be described in a ratio. As the quantity of liquid per unit measure of gas increases, it becomes necessary to more often remove the liquid slug. As will be understood, the plunger can lift an optimum size slug. If the slug is over the optimum size, inefficiencies will result and a portion of the slug will be lost on bypassing the plunger. The slug will drip through the plunger during transit time. The plunger need not be perfectly aligned to plug the passage. Indeed, since the plunger travels upwardly frictionally engaging the surrounding tubing, the liquid slug thereabove seeps through the narrow gap between the plunger and the tubing wall. This dripping keeps the surface moist which reduces friction. However, it also reduces the size of the slug which is recovered. As liquid is lost, the slug is reduced in size and more trips are then required. In summary, the liquid slug size is in part dependent on the rate of liquids that are produced, a function of the ratio of liquids into natural gas produced from the formation.

Another important factor in the rate of production is bottom hole pressure. If the well is flowing, bottom hole pressure represents the formation pressure, but that value is reduced by flow so that wellhead pressure is always less than bottom hole pressure. Over a period of time, the bottom hole pressure is reduced as the formation becomes partially depleted. Over a period of time, bottom hole pressure may reduce with production. Since this is not an instantaneous event, but is involved with depletion of the formation, it can be generally stated that shut-in pressure measured at the wellhead is a significant indication of the gas drive which lifts the plunger and the slug thereabove, and trip time of the plunger is in part dependent on this measurement. Also, bottom hole pressure when flowing is another factor in plunger operation.

Another variable is viscosity of the slug. This is typically determined by the size of the molecules which are in part due to corrosion and deposits on the tubing string which are washed by the condensate back into the slug. Millscale, rust and other particulates washed from the surface of the tubing string become important in converting the natural gas condensate into a heavier and more viscous fluid. In general however, viscosity is fairly well fixed because it is a function of the molecules removed from the production gas.

After a well has been substantially depleted and at the time the present apparatus is installed at the wellhead, the well is then produced periodically to obtain data. The data typically is recorded in graph form so that the ordinate is the amount of the fluid recovered and the abscissa is plunger trip time. Plunger trip time is the time required for the plunger to come to the surface. Plunger trip time is determined first by shutting in the well. This is easily done by closing the valve 30. The valve is held closed for a suitable interval. This is the shut-in interval. It is sufficiently long to permit the plunger to fall to the bottom. It falls to the bottom and settles at the bottom of the tubing string supported at the very bottom end of the tubing string and located so that the condensate slug accumulates on top of the plunger. A plunger run time is measured from the time of opening the valve 30. When that valve is opened, pressure in the tubing string is released and natural gas is produced from the well. At the instant the valve 30 is opened, pressure relief is noted along the tubing string and the relief coupled through the tubing string is experienced or noted at the plunger resting at the bottom of the tubing string. When the valve 30 is opened, timing clock can be started for determining a measured plunger trip or run. The valve 30 is left open. The plunger is then lifted beginning with reduction of pressure by opening the line valve 30. This causes the plunger to travel upwardly along the tubing string. Arrival of the plunger is noted at the surface sometime thereafter. It is normally accompanied with a slight noise, and if desired, a plunger passage indicator can be installed to detect arrival of the plunger.

In general terms, plunger run time is proportional to the amount of fluid which is recovered. The relationship is given by the simple equation $T = A + BQ$ where $T$ is the total time for the plunger return to the surace. $A$ is derived from the run time required if the slug were zero in volume. $BQ$ is a constant times the size $Q$ of the slug delivered. In a typical well which is 9,800 ft. deep, data was obtained indicating a eight minute trip assuming the slug were nonexistent. A slug of a certain size would increase the trip to about sixteen minutes, which a slug of twice the size would stretch the trip to about twenty-four minutes. Moreover, this was accomplished in a well utilizing different flow cycles and shut-in cycles. Depending on the permeability of the formation, typical cycles utilized flow intervals of about thirty to forty-five minutes. Shut-in intervals typically ranged from forty-five minutes to two hours. In general terms, many data points collected over a period of time provide data which, when plotted as a function of delivered slug versus plunger travel time, yields a plot with fairly good empirical support to the relationship described above. Additional data taken from a well having a depth of 8,234 feet flowing for one hour with a forty-five minute shut-in cycle indicates that the run time without a slug was about 13.3 minutes. In this particular instance, wellhead pressure was in the range of about 100-120 psi.

After plunger travel it is possible that the plunger drop back down the well to pick up the next slug. It may be beneficial to operate the well holding the plunger at the wellhead location because this may to allow accumulated condensate in the borehole to grow. This mode of operation is beneficial and economical to the owner in that the gas may flow until another slug of condensate is accumulated in the tubing string. In other words, the slug is removed once, and the well is thereafter flowed which can vary in duration to permit substantial has recovery while the next condensate slug is accumulated. Then after it has accumulated, a plunger can thereafter remove all of substantially all of the next slug. In general terms, the total liquid produced by a declining gas well is relatively small, typically in the range of just a few barrels per day. In the first example given above, production was about three barrels per day. In the second example, the average daily fluid production was about two barrels per day. In both instances, the produced fluid had relatively low viscosity because the fluid was primarily light condensates.

The method of the present invention therefore contemplates conducting a first test to determine the rate at which fluid is produced. This data typically is verified by historical data regarding the well. For instance, when the well is able to flow continuously, the condensate is simply delivered beyond the tubing string where it may be stripped from the production gas flow. This flow and subsequent stripping provides a relatively quick ratio. The measure reflects approximate daily fluid production which, as stated, is a few barrels per day in most declining wells. If the production is three barrels per day or 126 gallons, the next step is to estimate the approximate time required for the plunger to travel from the bottom to the surface without a column of condensate. The well can be shut-in immediately after introducing the plunger into the well. The plunger is dropped to the bottom. This can be accomplished as after removal of any accumulated condensate. The travel time is then measured. The total daily fluid production is allocated to the estimated number of trips that the plunger will make to determine the approximate size of the slugs of liquid carried by the plunger. The shut-in interval is set to permit bottom hole pressure to recover. Bottom hole pressure is measured at the surface in a nonflowing condition. Based on wells at comparable depths, an estimate of the approximate time required for plunger travel is then made. The estimated time is extended to take into account the calculated slug size. This is determined by evaluating the prior liquid production rate and allocating it over the number of plunger trips carrying the accumulated liquid. For instance, one example above describes a well at 9,800 foot depth which produces about three barrels per day. If the well is operated with a one-half hour flow interval and a one-hour shut-in interval, this provides sixteen plunger trips per day. Sixteen daily trips must remove three barrels (about 126 gallons) or approximately eight gallons per trip. The well should be produced so that this optimum number of plunger trips is involved, and data is then taken to confirm this operating sequence. In this example, the well is thus permitted to flow for one-half hour and then it is shut-in for one hour. This operation sequence permits the produced eight gallons from the formation to be collected in the tubing string and lifted above the plunger as the produced liquid slug is removed.

The foregoing can be accomplished under control of the timer which operates the motor which in turn operates the valve. When the plunger is forced up through the tubing string, it will pass into the lubricator extension 44. The pressure drive below the plunger is reduced when the plunger clears the flow line 28. Upward momentum will on rare occasion carry the plunger upwardly, hitting against the piston 48 and flexing the coiled spring 50. If desired, the interceptor 48 can be constructed to catch on the fishing neck. This would require subsequent release steps. The preferred form of apparatus forces the plunger upwardly against the piston where it is not held. When this occurs, shock is absorbed at the spring 50, the spring compresses and thereafter releases the plunger for downward fall.

Normally, the plunger will not travel that far into the lubricator extension 44. If the pressure drive is weak, and leakage past the plunger reduces plunger velocity, it may rise slightly above the flow line 28 and fall back across the flow line. So to speak, the plunger will then bridge the flow line and dance just above it as it cannot penetrate any farther into the lubricator extension. The small flow line 42 is incorporated to reduce pressure build-up in front of the plunger in the dead end cylinder arrangement which includes the lubricator extension. It is better to bleed off pressure in front of (or above) the plunger and thus relieve this pressure. The small line 42 is a product flow line which delivers a small flow. This reduces pressure build up. Gas is delivered to the downstream production system. The line 42 therefore is a pressure relief line under control of a motor controller operating a control valve. Interestingly, if the formation pressure is higher, sufficient to cause the plunger to travel rapidly, it will move rapidly to the very top end of the extension 44. Reduced formation pressure drive creates the risk defeated by the incorporation of the line 42. As pressure differentials increase the line 42 has less value, and can be omitted if there is a high pressure drive.

While the foregoing is directed to the preferred embodiment, the scope thereof is determined by the claims which follow.

What is claimed is:

1. Wellhead apparatus for attachment to a gas well in which a reciprocating plunger has a large diameter dimension fitting in the tubing for repetitive travel along the production tubing string extending from the bottom of the tubing in the well to the wellhead, the apparatus comprising:

(a) a transition tubing having an internal diameter size to fit about the plunger to contact the circumferential exterior of the plunger to guide the plunger for vertical movement therealong;
   (b) a tee serially connected with said transition tubing and having a side flow port for removing well production fluid flow therefrom;
   (c) a transverse shoulder above said tee;
   (d) a lubricator extension having a mating shoulder contacting said transverse shoulder and adapted to be joined thereto by a removable shoulder engaging connector; and wherein said tubing string, transition tubing tee, and lubricator extension define a plunger pathway;

(e) an internally located and positioned plunger interceptor at the upper end of said lubricator extension;

(f) first and second lateral gas flow lines, said second line connected above said first flow line to prevent pressure cushioning in said lubricator extension as the plunger enters thereinto;

(g) a pivotal anchor suspending said lubricator extension above said shoulders and said anchor enables said lubricator extension to be moved to the side to open said tee and lubricator extension;

(h) wellhead located support means above the tubing string and aligned with the tubing string to receive the plunger from the tubing string into said transition tubing;

(i) a master valve serially connected above said transition tubing and having valve inlet and outlet means axially aligned and connected with said tee to enable the plunger to pass into said tee;

(j) a union sub and a union nut for clamping said two shoulders together; and (k) resilient means mounting said interceptor for yielding in response to the plunger traveling through said lubricator extension in response to pressure drive moving the plunger upwardly against said interceptor.

2. The apparatus of claim 1 including an upstanding ladder means enabling personnel to climb thereon adjacent to the wellhead to obtain access to said lubricator extension, said ladder means having a laterally projecting portion extending over said lubricator extension wherein said portion supports said lubricator extension in axial alignment with the tubing string.

3. The apparatus of claim 2 wherein said projecting portion supports said lubricator extension on a pivotal swinging connection means, and said lubricator extension is supported on said tee.

4. The apparatus of claim 1 wherein said tee connects with said second flow line at the side port thereof, and further including a valve in said second line capable of switching between on and off conditions to control flow therethrough, operator means for said valve, and timing means for said operator means to selectively and controllably open and close said valve to thereby obtain shut-in of the gas well.

5. The apparatus of claim 1 wherein said plunger has a fishing neck on the upper end thereof, a surrounding tapered surface portion below said fishing neck and on the body of said plunger wherein said tapered portin has an angle of about 8° with respect to a central axis through said plunger, and wherein said plunger is sized relative to said transition tubing so that said plunger may pass therethrough substantially without wobble and achieves entry thereinto at said tapered portion.

6. The apparatus of claim 1 further wherein said apparatus received a plunger therein and said plunger is sized to extend between selected upper and lower diameter sizes and moves in transition between sizes.

7. The apparatus of claim 1 wherein the plunger includes:
(a) an elongate body;
(b) lengthwise externally exposed segmental portions along said body;
(c) resilient means urging said segmental portions radially outwardly into contact with the tubing string and enabling close sealing therein; and
(d) a fishing neck on the upper end of said body.

8. The apparatus of claim 3 wherein said tee connects with said second flow line at the side port thereof, and further including a valve in said second line capable of switching between on and off conditions to control flow therethrough, operator means for said valve, and timing means for said operator means to selectively and controllably open and close said valve to thereby obtain shut-in of the gas well.

9. The apparatus of claim 8 wherein said plunger has a fishing neck on the upper end thereof, a surrounding tapered surface portion below said fishing neck and on the body of said plunger wherein said tapered portion has an angle of about 8° with respect to a central axis through said plunger, and wherein said plunger is sized relative to said transition tubing so that said plunger may pass therethrough substantially without wobble and achieves entry thereinto at said tapered portion.

* * * * *